UNITED STATES PATENT OFFICE.

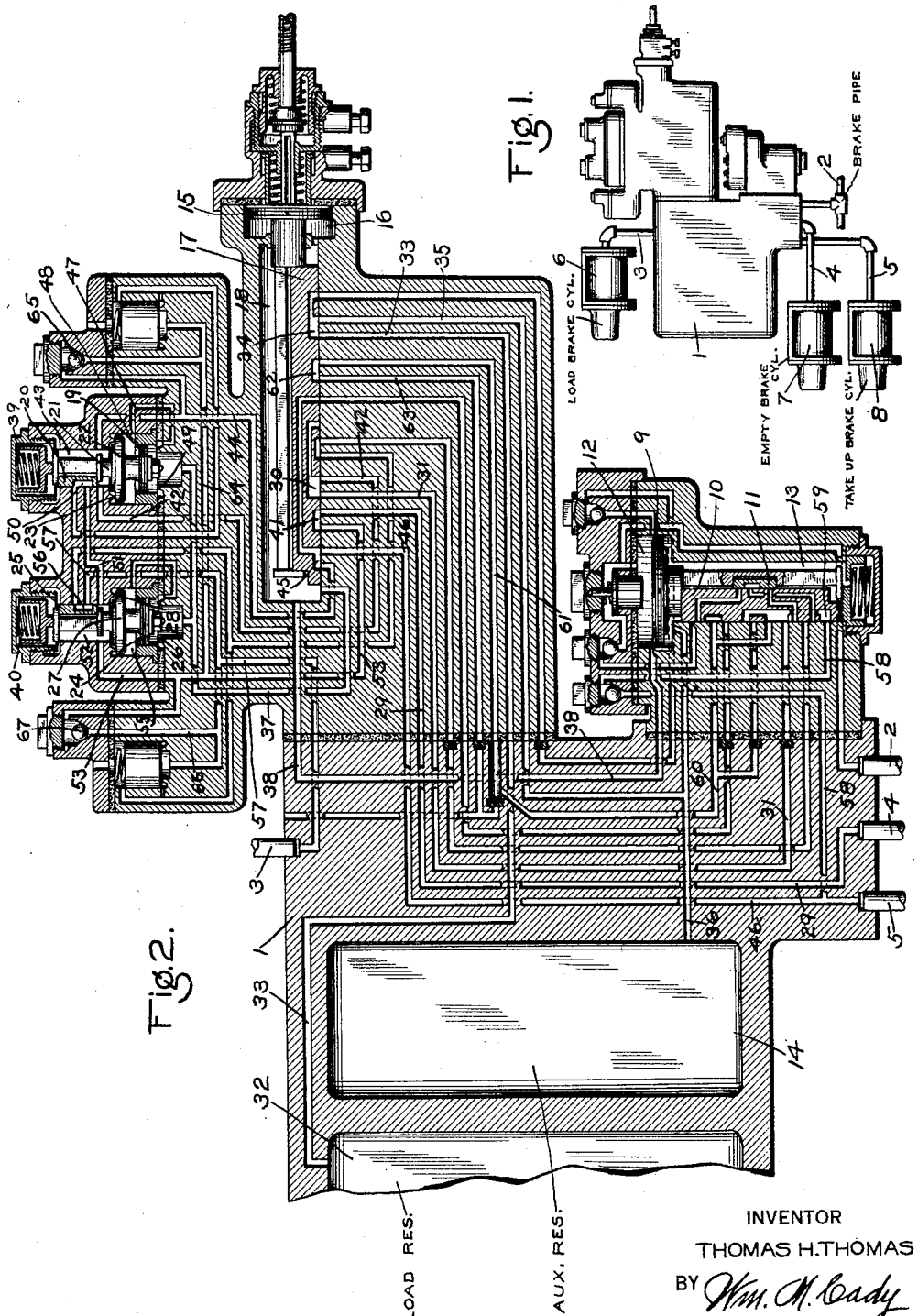

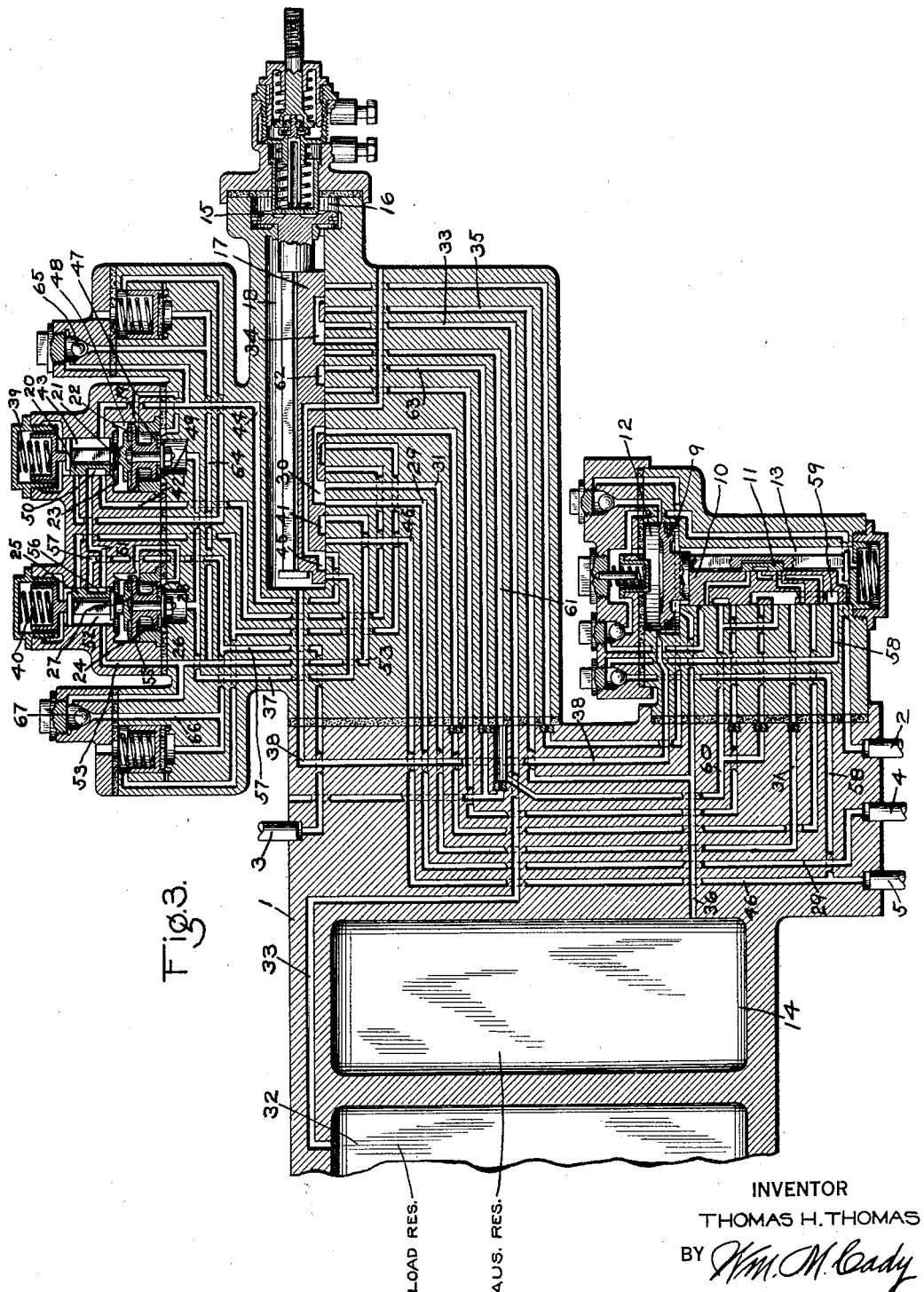

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

EMPTY AND LOAD BRAKE.

1,394,049.  Specification of Letters Patent.  Patented Oct. 18, 1921.

Application filed November 29, 1920. Serial No. 426,976.

*To all whom it may concern:*

Be it known that I, THOMAS H. THOMAS, a citizen of the United States, residing at Edgewood, in the county of Allegheny and State of Pennsylvania, have invented new and useful Improvements in Empty and Load Brakes, of which the following is a specification.

This invention relates to fluid pressure brakes, and more particularly to a valve device for empty and load brake control.

In my prior pending application, Serial No. 321,399, filed September 3, 1919, an empty and load brake equipment is disclosed in which there is provided certain valve devices for controlling the admission of fluid under pressure to the empty and load brake cylinders in applying the brakes.

It is highly desirable that the valve devices above referred to shall move promptly and positively from either operating position to the other, so that there will be no danger of the valve device stopping at an intermediate position, where leakage may occur which would tend to prevent the desired application or release of the brakes as intended.

The principal object of my invention is to provide a valve device of the above character having means for insuring the prompt and positive movement of the valve device in either direction.

In the accompanying drawings; Figure 1 is a diagrammatic view of an empty and load brake equipment embodying my invention; Fig. 2 a central sectional view of the empty and load brake controlling valve mechanism, showing the parts in load position, with the brakes released; and Fig. 3 a view similar to Fig. 2, showing the parts in empty position.

The equipment shown in the drawings comprises an empty and load brake controlling valve mechanism 1, connected to brake pipe 2 and by the respective pipes 3, 4, and 5, to the load brake cylinder 6, the empty brake cylinder 7, and the take-up brake cylinder 8.

The controlling valve mechanism 1 comprises a triple valve device having a piston 9, a main slide valve 10, and a graduating slide valve 11 adapted to be operated by piston 9, the piston chamber 12 being connected to the brake pipe 2 and valve chamber 13 to auxiliary reservoir 14.

The valve mechanism 1 also includes a change-over valve device comprising a piston 15 contained in piston chamber 16 and a slide valve 17, contained in valve chamber 18, and adapted to be operated by piston 15.

For controlling the admission of fluid under pressure to the empty brake cylinder 7 in applying the brakes when the car is loaded, a valve device is provided having a piston 19 and a slide valve 20 adapted to be operated by said piston.

According to the principal feature of my invention, said valve device is provided with means for insuring the prompt and positive movement of the parts in either direction and for this purpose the piston 19 is adapted to engage a seat ring 49 upon movement in one direction, the seat ring 49 being adapted to expose an area of piston 19 to fluid pressure less than the full area thereof.

The piston stem 21 also carries a seat 22 which is adapted to engage a seat ring 23 upon movement of the piston 19 in the opposite direction, the area exposed to fluid pressure in the seated position being greater than the area of piston 19.

A similar valve device is provided for controlling the supply of fluid to the load brake cylinder 6, comprising a piston 24, a slide valve 25, a seat ring 26 for piston 24, and a seat 27 adapted to engage a seat ring 28.

The construction and operation of the apparatus shown and described, as a whole, is substantially the same as that disclosed in my prior application, Serial No. 321,399, filed September 3, 1919, and hereinbefore referred to, the novel features of the present invention residing in the valve devices which control the admission of fluid under pressure to the respective brake cylinders in applying the brakes.

Under the above circumstances, it is not deemed necessary or desirable to describe the complete operation of the equipment and therefore only so much of the operation will be described as appears necessary to fully explain the operation of the valve devices in question.

If the change-over valve device is adjusted for empty car braking, as shown in Fig. 3 of the drawings, the empty brake cylinder 7 is connected through passage 29 and cavity 30 in change-over slide valve 17 with passage 31, leading to the seat of the triple slide valve 10 and when the brake pipe pressure is reduced to effect an application of the brakes, the triple valve device will be operated to supply fluid under pressure from valve chamber 13 and the auxiliary reservoir 14 to the empty brake cylinder 7.

If the change-over valve device is adjusted for loaded car braking, as shown in Fig. 2 of the drawings, the load reservoir 32 is connected to the auxiliary reservoir 14 through passage 33, cavity 34 in change-over valve 17, passage 35, and passage 36, and the exposed areas of the pistons 19 and 24 below the seat rings 49 and 26 are subjected to the pressure in valve chamber 18, since passage 37 is uncovered by the outward movement of slide valve 17.

In the release position of the triple piston 9, the valve chamber 18 is subjected to brake pipe pressure supplied from piston chamber 12, through passage 38, so that fluid at brake pipe pressure is supplied to the exposed areas of the pistons 19 and 24 and said pistons are thereupon shifted, against the resistance of the respective springs 39 and 40, so that the seats 22 and 27 engage the seat rings 23 and 28.

With the parts in loaded car position, if the brake pipe pressure is reduced to effect an application of the brakes, the triple valve is shifted to service application position, in which fluid is supplied from the valve chamber 13 and the combined auxiliary reservoir and load reservoir volumes to the take-up brake cylinder 8 through passage 31, cavity 30 in change-over slide valve 17, passage 42 to valve chamber 43 containing slide valve 20 and thence through passage 44, cavity 45 in slide valve 17, and passage 46 to the take-up brake cylinder 8.

The area of the seat 22 is thus subject to the pressure of fluid supplied to the take-up brake cylinder on one side, and on the opposite side to the pressure of fluid supplied from the valve chamber 18, it being noted that a feed passage 47 permits the flow of fluid from said valve chamber to the chamber 48.

When the pressure supplied to the take-up brake cylinder plus the pressure of the spring 39 slightly exceeds the pressure acting in chamber 48, the seat 22 will be moved from engagement with the seat ring 23. It will now be noted that when the seat 22 is moved from the seat ring 23, the pressure in chamber 48 substantially equalizes around the seat with the take-up brake cylinder pressure in valve chamber 43, and consequently the area subject to pressure from valve chamber 18 is now that of piston 19, but since the area of piston 19 is less than the area defined by the seat ring 23, it will be seen that the pressure opposing the movement of the parts toward the seat ring 49 is less after the seat 22 moves from engagement with the seat ring 23. As a consequence the parts will move promptly and positively to the opposite position when once started.

Upon movement of piston 19 to its seat, the slide valve 20 establishes communication from the service supply passage 42 to the empty brake cylinder 7 through cavity 50 in slide valve 20 and passage 51 to valve chamber 52 and thence through passage 53, cavity 41 in slide valve 17, and passage 29 to the empty brake cylinder 7.

It will be seen that the pressure of fluid supplied to the empty brake cylinder 7 acts in valve chamber 52 on the area of the seat member 27 which is defined by the seat ring 28, so that when the pressure of fluid supplied to the empty brake cylinder plus the pressure of the spring 40 slightly exceeds the pressure acting in chamber 55 on the opposed area of seat 27, said seat will be moved from engagement with the seat ring 28 and since the area exposed to fluid pressure from valve chamber 18 is now reduced to that of the piston 24, a prompt and positive movement of the parts to the position in which piston 24 seats on the seat ring 26 is assured.

The movement of slide valve 25, thus produced, operates to connect the service supply passage 42 with the load brake cylinder 6 through cavity 50 in slide valve 20, passage 51, cavity 56 in slide valve 25 and passage 57.

Upon increasing the brake pipe pressure to effect the release of the brakes, the triple piston 9 is shifted to release position, and fluid is released from the take-up brake cylinder 8 through passage 46, passage 58, cavity 59 in slide valve 10, passage 60, passage 61, cavity 62 in slide valve 17, and passage 63.

Since the take-up brake cylinder 8 is open to the valve chamber 43 through passage 44, the pressure is also reduced in said chamber, and when the brake pipe pressure acting on the seated area of piston 19 has increased to a certain degree, the resistance of spring 39 is overcome, and the piston 19 is unseated, exposing the full area of the piston to brake pipe pressure and thereby insuring the prompt and positive movement of the parts to the upper seated position.

Fluid from the empty brake cylinder 7 is also released through passage 29, cavity 41 in slide valve 17, passage 53, and passage 64, past check valve 65, to passage 44.

The reduction in empty brake cylinder pressure in valve chamber 52 with the increase in brake pipe pressure acting below the piston 24 acts to move the piston 24 against the resistance of spring 40, and since the unseating of piston 24 exposes the full area thereof to brake pipe pressure, the prompt movement of the parts to the upper seated position is assured.

Fluid is released from the load brake cylinder 6 through passage 57, and passage 66 past check valve 67, to passage 64.

It will now be evident from the foregoing description that if either of the valve devices for controlling the admission of fluid to the empty and the load brake cylinders are once started from either seated position, the prompt and positive movement to the opposite position is always assured.

By suitably proportioning the areas of seats with respect to the areas of the pistons 19 and 24, the parts can be designed to move at any desired differential of pressures.

Having now described my invention, what I claim as new and desire to secure by Letters Patent, is:—

1. In a fluid pressure brake, the combination with a valve, of means having a seated position and subject to opposing fluid pressures for operating said valve, said means having one area which is subject to the opposing fluid pressures in the seated position and a reduced area which is subject to said pressures when unseated.

2. In a fluid pressure brake, the combination with a valve, of means having a seated position and subject on one side to fluid under pressure and responsive to an increase in fluid pressure on the opposite side for operating said valve, said means having one area subject to the opposed fluid pressures in the seated position and a reduced area subject to said pressures when unseated.

3. In a fluid pressure brake, the combination with a valve, of means adapted to seat in opposite directions and including a piston for operating said valve, said means being subject in one seated position to fluid under pressure acting on a predetermined area and having a reduced area subject to said pressure upon movement from said position.

4. In a fluid pressure brake, the combination with a valve, of means adapted to seat in opposite directions and including a piston for operating said valve, said means being subject in one seated position to fluid under pressure acting on a predetermined area and having a reduced area subject to said pressure upon movement from said position, said means being subject to said fluid pressure in the other seated position and adapted to expose a larger area to said pressure upon movement from the seated position.

5. In a fluid pressure brake, the combination with a valve, of means for operating said valve having two seated positions and subject on one side over a certain effective area in one seated position to fluid under pressure, a smaller effective area being subject to fluid pressure when unseated, and a still smaller effective area in the other seated position.

6. In a fluid pressure brake, the combination with a valve, of means for operating said valve comprising a seat member subject in the seated position on one side to fluid under pressure over a predetermined area and a piston subject over a less area to fluid under pressure.

7. In a fluid pressure brake, the combination with a brake pipe and brake cylinder, of an additional brake cylinder, a valve for controlling a fluid pressure connection to the additional brake cylinder, and means for operating said valve, having a seated position in which said means is subject to the opposing pressure of the brake pipe and the first mentioned brake cylinder over a predetermined area, said means having a reduced area subject to said opposing pressures when unseated.

8. In a fluid pressure brake, the combination with a brake pipe and brake cylinder, of an additional brake cylinder, a valve for controlling a fluid pressure connection to the additional brake cylinder, and means for operating said valve having a seated position and subject on one side to the pressure of a spring and the first mentioned brake cylinder and on the opposite side to brake pipe pressure, one area of said means being subject to the opposing fluid pressures in the seated position, and a reduced area which is subject to said opposing pressures when unseated.

9. In a fluid pressure brake, the combination with a brake pipe and brake cylinder, of an additional brake cylinder, a valve for controlling a fluid pressure connection to the additional brake cylinder, and means for operating said valve comprising a seat member and a piston, the seat member being subject over a predetermined area in the seated position to the opposing pressures of the first brake cylinder and the brake pipe, and said piston being subject, upon movement from the seated position, to said opposing fluid pressures.

In testimony whereof I have hereunto set my hand.

THOMAS H. THOMAS.